Figure 1:
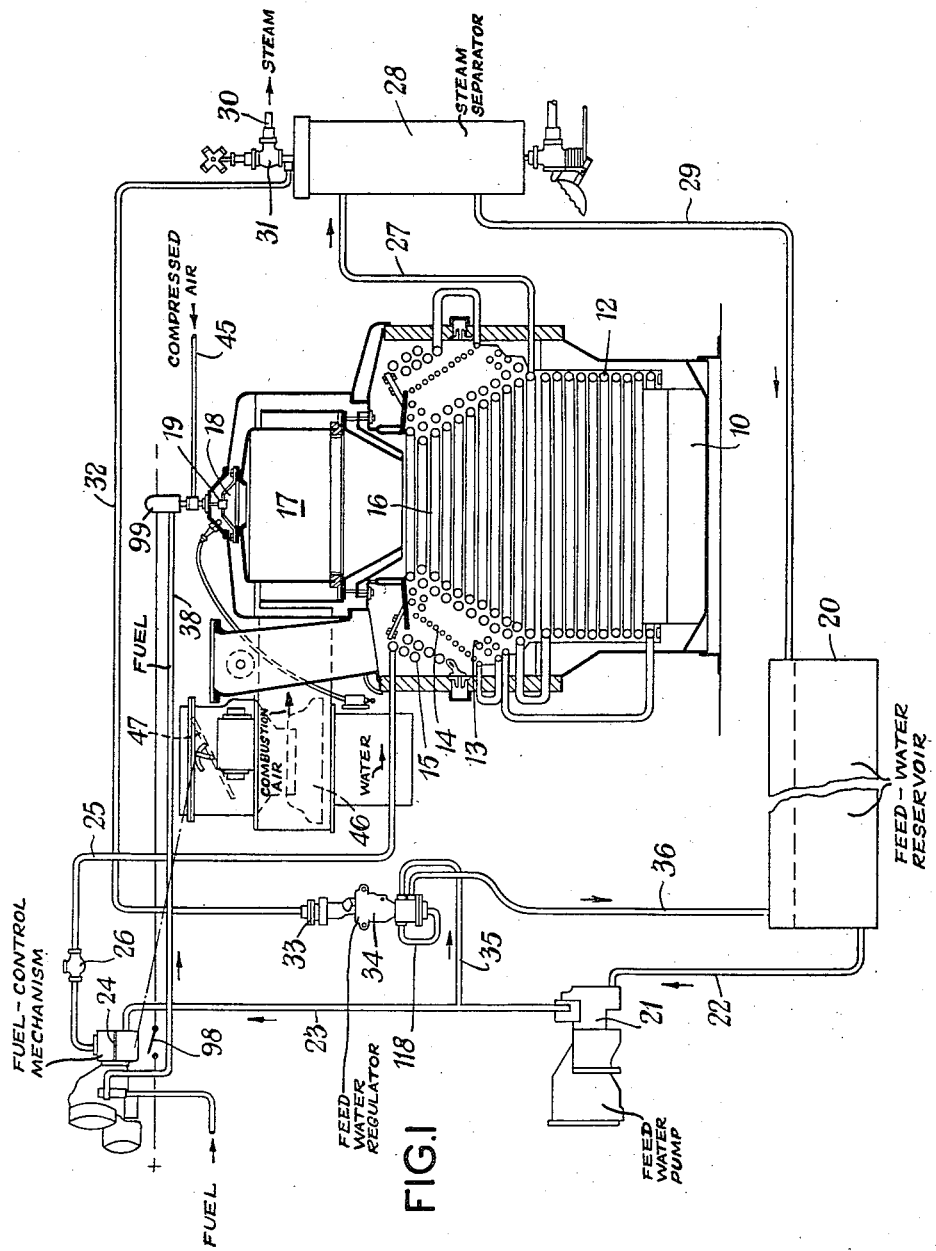

Oct. 1, 1963  H. E. GARDAM  3,105,468
LIQUID REGULATORS FOR BOILERS
Filed Sept. 14, 1959  2 Sheets-Sheet 1

Inventor
Harry E. Gardam
by Sommers + Young
Attorneys

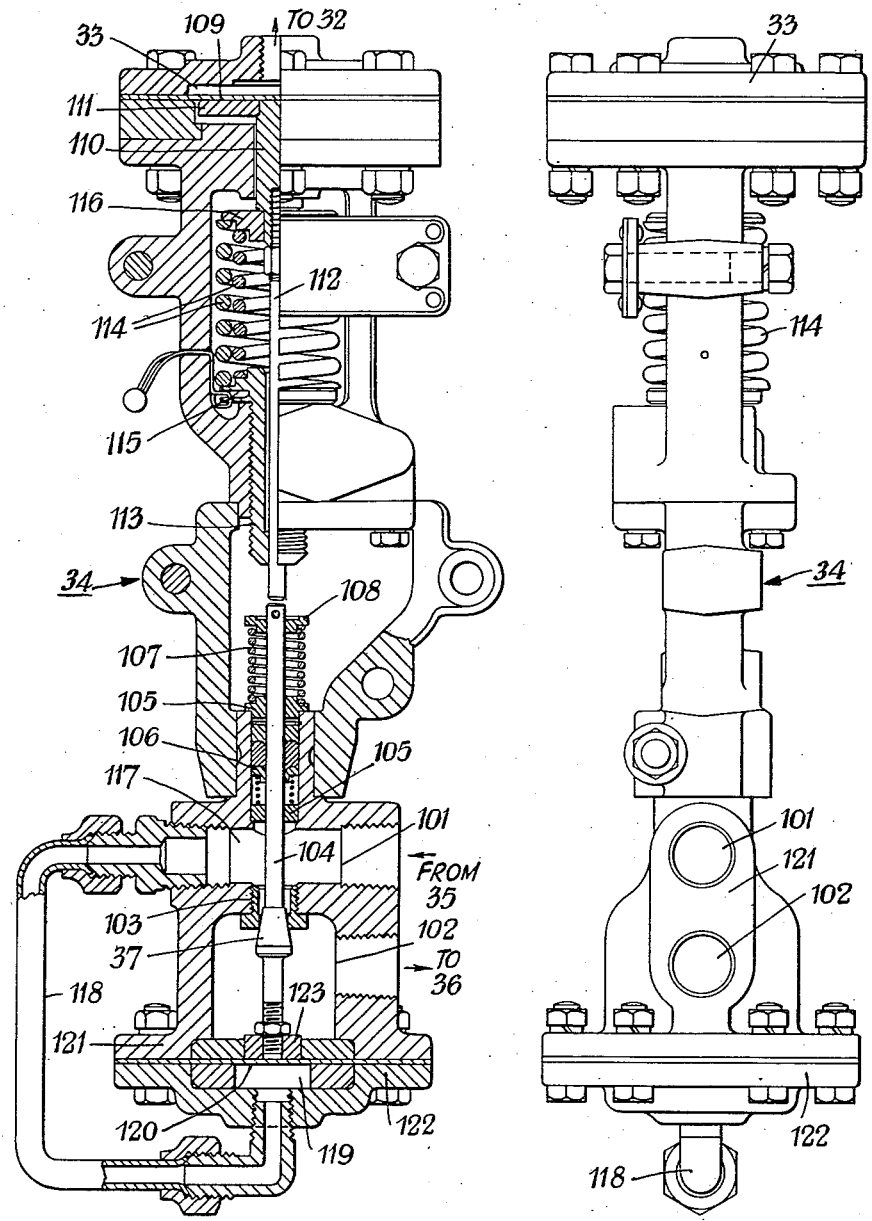

_United States Patent Office_

3,105,468
Patented Oct. 1, 1963

3,105,468
LIQUID REGULATORS FOR BOILERS
Harry Edward Gardam, Hayes, Bromley, England, assignor to J. Stone & Company (Deptford) Limited, London, England
Filed Sept. 14, 1959, Ser. No. 839,735
Claims priority, application Great Britain Sept. 25, 1958
3 Claims. (Cl. 122—451)

This invention concerns improvements relating to liquid regulators of the by-pass type for boilers, especially but not exclusively feed-water regulators for steam generators. Such regulators are employed for metering the amount of feed water supplied to steam-generating coils proportionately to the rate of evaporation of water therein. They can be employed, for example, in conjunction with oil-burning water-tube or "flash" boilers in the manner described in the specification of United States Patent No. 2,735,410 (Vapor Heating Corporation).

With an arrangement of this kind, the feed-water pump supplies water at a constant rate to the regulator which by-passes or diverts the water not required for evaporation at the instant, while the rest of the water passes on to the steam-generating coils. Thus, the by-pass valve of the regulator is closed or almost closed when evaporation is a maximum and is fully open when evaporation is a minimum. The position of the valve is controlled by the balancing of the generator steam pressure acting on a diaphragm and tending to open the valve and the force exerted by a control spring or springs tending to close said valve. The required steam pressure can be set by adjusting the compression of the spring or springs. As there must be movement of the valve in dependence upon the rate of evaporation, the spring force varies and consequently the steam pressure increases as the rate of evaporation is reduced.

In the by-pass regulator in accordance with the present invention, the position of the valve is made dependent not only upon the vapour pressure and an opposing control force, for example spring force, but also upon a second opposing force which varies with the rate of evaporation. The regulator thus incorporates a differential effect. In a system in which the delivery pressure of the water-feed pump decreases with decrease in the rate of evaporation, due to the change in resistance resultant upon the reduced quantity of water forced through the steam-generating coils and the increased quantity by-passed, the second opposing force may conveniently be derived from the said delivery pressure. However, the said force may alternatively be derived from some other equivalent variable, for instance varying fuel pressure at the oil-burner nozzle.

At any rate of evaporation within a given modulation range, the three forces will be in equilibrium, with the valve in such a position as to by-pass the correct amount of water for the said rate. If the steam demand decreases, this condition will be reflected in the regulator by a momentary slight increase in the steam pressure. The equilibrium will be upset and the valve will open further until equilibrium is restored at the new rate. An increased demand will have the converse effect.

A preferred form of embodiment of the invention is illustrated by way of example in the accompanying drawings, in which:

FIGURE 1 is a diagram of a steam-generating system incorporating the improved water regulator, FIGURE 2 is in part a longitudinal axial section through the regulator and in part a front elevation thereof, and FIGURE 3 is a side elevation at right angles to FIGURE 2.

With reference to FIGURE 1, the steam generator 10 may be of known water-tube type. As illustrated, it comprises several concentric groups of the tube coils 12–15 connected in series and embracing a heating chamber 16 above which there is a fire chamber 17. As illustrated, a burner 18 is provided with an atomizing nozzle 19 for liquid fuel. Alternatively a nozzle for a gas fuel may be provided.

Feed water is withdrawn from a reservoir 20 and forced through the coils of the boiler 10 by a pump 21. The feed-water flow is by way of conduit 22, pump 21, conduit 23, flow-responsive fuel-control mechanism 24 and conduit 25 to the coil 15. A check valve 26 serves to prevent reverse flow. Steam and hot water emerging from the coil 12 pass through a conduit 27 to a steam separator 28 where the hot water is separated and returned to the reservoir 20 through a conduit 29. Steam can be drawn from the separator 28 through a conduit 30 having a shut-off valve 31.

The upper end of the separator 28 is connected by a tube 32 to a pressure chamber 33 at the upper end of a feed-water regulator 34. This regulator has the form of a valve assembly whose water-inlet port is connected through a by-pass conduit 35 to the conduit 23, while its water-outlet port is connected by a return conduit 36 to the reservoir 20.

When the pressure of the steam issuing from the separator 28 is above a predetermined value, the by-pass valve 37 of the regulator 34 will be open to divert feed water from the conduit 23 and return it to the reservoir 20. The pump 21 has a constant output, so that the water delivered to the generator 10 through the conduit 25 will depend upon the extent to which the valve 37 is opened. As hereinafter more fully described, the value is spring loaded and the extent of its opening will depend upon the generated steam pressure. As will be appreciated, the volume of water delivered through the control mechanism 24 is reduced to the extent of the volume diverted back to the reservoir 20. The mechanism 24 is designed to control the delivery of fuel through the conduit 38 to the nozzle 19 in proportion to the flow of feed water through the said mechanism.

Compressed air, if required for fuel-atomizing purposes, is delivered to the nozzle 19 through a conduit 45. The volume of combustion air supplied to the burner 18 in the form of a forced draught from a fan 46 is controlled by a damper 47 which is, in turn, controlled automatically by the mechanism 24. Thus both the fuel supply and the combustion-air supply are controlled under the influence of the rate of feed-water supply.

A suitable mechanism 24, embodying a hydraulic servo device, and its manner of operation are more fully described in the aforesaid specification.

The by-pass regulator illustrated in FIGURES 2 and 3 has an inlet port 101 communicating with the by-pass conduit 35 and an outlet port 102 communicating with the return conduit 36. A bush 103 provides a seat for the downwardly opening, upwardly tapering, valve 37. The valve 37 is carried by a stem 104 which is slidably guided by bushes 105, passes upwardly through a water seal 106, and is maintained normally seated by means of a light helical spring 107 acting on the said stem through a collar 108.

The pressure chamber 33 contains a flexible impervious diaphragm 109 clamped around its margin. A plunger 110 with a head 111 underlying the diaphragm 109 carries at its lower end a valve-operating rod 112 adjustably screwed into the said plunger and slidably guided in an adjustable bush 113. The plunger 110 is loaded upwardly by helical control springs 114 acting between the head 115 of the bush 113 and a collar 116 on the said plunger. The initial compression in the springs 114 can be set by adjustment of the bush 113.

Downward movement of the plunger 110 to bring the rod 112 into contact with the stem 104, for opening the valve 37 against the spring 107, will not occur until there is such a steam pressure in the chamber 33 as will overcome the resistance of the springs 114. As so far described, the steam-generating system and the regulator are substantially similar to those more fully described in the aforesaid specification.

The chamber 117 above the valve 37 is connected by a conduit 118 to a chamber 119 below a flexible impervious diaphragm 120 whose margin is clamped between the valve housing 121 and its cover 122. The diaphragm bears against the valve stem 104 by ways of a button 123 adjustably secured on the screw-threaded lower end of the said stem. The underside of the diaphragm 120 is subject to the delivery pressure of the feed-water pump 21 by way of the conduit 35, chamber 117 and conduit 118.

In normal steady operation of the steam generator 10, the forces affecting the valve 37, namely the steam pressure acting on the diaphragm 109, the force of the control springs 114 and the water pressure acting on the diaphragm 120, will be in equilibrium, with the said valve in such a position as to by-pass the correct amount of water for the current rate of evaporation. If the steam demand decreases, this condition will be reflected in the regulator 34 by a momentary slight increase in the steam pressure on the diaphragm 109. The equilibrium will be upset and the valve 37 will open further until equilibrium is restored at the new rate of evaporation. When the valve 37 so opens, the force of the springs 114 will increase, but the water-pressure on the diaphragm 120, dependent on the pump-delivery pressure, will decrease. An increased demand for steam will have the converse effect. By suitably proportioning the forces, it is possible to ensure that the steam pressure will be maintained substantially constant, or increase or decrease in required fashion, over the given range of rate of evaporation. Constancy of pressure within 2% or less can be maintained over the said range, for example from 100% evaporation down to 20% evaporation. The forces can be proportioned by suitable co-ordination of the areas of the diaphragms 109, 120 and the parts 111, 123 through which they influence the valve 37 and the strengths and rates of the control springs 114 employed. The parts 110, 123 are shown adjustable. They may also be interchangeable to suit different requirements.

The tapering valve 37 can be designed to have a relatively long stroke without this resulting in substantial variation of steam pressure over the evaporation range. The long stroke allows of the attainment of a high degree of fine control of the evaporation rate. It is also possible to achieve high stability of operation with avoidance of hunting under normal conditions.

For shutting off all delivery of fuel to the nozzle 19 if the evaporation rate required is below the range which can be controlled with the burner 18 continuously alight, the fuel-control mechanism 24 of the aforesaid specification is provided, as shown in FIGURE 1, with normally closed contacts 98 in the circuit of a solenoid valve 99 which controls the fuel conduit 38. When the contacts 98 are opened by the mechanism 24, the normally open valve 99 closes and shuts off the delivery of fuel. By this means, when the required evaporation rate is below the aforesaid range, the burner 18 and generator 10 will be "cycled" on and off in known manner to suit the demand. Rapid such cycling, however, is detrimental to the generator.

Excessively rapid cycling can be reliably prevented with the regulator according to the present invention without the necessity for providing further means for that purpose and without the steam pressure being allowed to rise above the controlled value. With the regulator arrangement illustrated, the fuel will be cut off and the generator will cycle off at the controlled value of the steam pressure, but the fuel will not be restored for the generator to cycle on until the said pressure has dropped below the controlled value by a predetermined amount, so that there will be a delay and a longer total cycling period. The reason for this is as follows: When the generator cycles off, the by-pass valve 37 is wide open and is returning to the conduit 36 all the water delivered by the pump 21. Before the generator can be cycled on again, a predetermined definite movement of the hydraulic servo device embodied in the control mechanism 24 will be necessary to close the contacts 98 and cause the fuel valve 99 to be re-opened. This movement can be caused only by a predetermined increase in the rate of water flow through the mechanism 24 and is therefore dependent upon a partial closing of the by-pass valve 37. When the generator cycles off, the forces affecting the valve 37 are in equilibrium, the steam pressure tending to open it against the water pressure and spring force. As, under this condition, the water force, as well as the spring force, is virtually constant, a predetermined reduction in steam pressure is accordingly required to produce an increase in the rate of water flow and make the generator cycle on again.

It may be desirable to incorporate a restrictor in the duct 32 leading to the pressure chamber 33. This may take the form of a sintered-metal filter fitted in the top part of the said chamber.

I claim:

1. In combination with a steam generator having a steam outlet, a feed-water regulator of the bypass type comprising a bypass valve, means connected with said generator at said outlet and responsive to steam-pressure at said generator outlet and having an operative connection means acting upon the said valve in the direction for opening the same, means exerting a control force opposing the said steam-pressure responsive means, a diaphragm means subject to a fluid pressure variable with the rate of evaporation in the said generator, an operative connection means between the said diaphragm means and the said bypass valve through which the said diaphragm means acts, under the influence of the said fluid pressure, on the said valve in opposition to the said steam-pressure responsive means, to tend to close said valve.

2. The combination claimed in claim 1, and wherein the said steam-pressure responsive means also includes a diaphragm means which is subject to the said steam-pressure, said connection means comprising adjustable valve actuating rods operably connecting said respective diaphragm means and said bypass valve, the respective diaphragm means being arranged to operate upon the said bypass valve through said adjustable valve actuating rods.

3. In combination with a steam generator having a steam outlet, a feed-water regulator of the bypass type comprising a bypass valve, means connected with said generator at said outlet and responsive to steam-pressure at said generator outlet and acting upon the said valve in the direction for opening the same, means exerting a control force opposing the said steam-pressure responsive means, a diaphragm means which is subject to the feed-water pressure as controlled by the bypass regulator, and an operative connection between the said diaphragm and the said bypass valve through which the said diaphragm acts, under the influence of the said feed-water pressure, on the said valve in opposition to the said steam pressure responsive means, to tend to close said valve.

References Cited in the file of this patent

UNITED STATES PATENTS

| | | |
|---|---|---|
| 737,984 | White | Sept. 1, 1903 |
| 832,620 | Noyes | Oct. 9, 1906 |
| 1,145,671 | Butcher | July 6, 1915 |
| 1,821,112 | Muren | Sept. 1, 1931 |
| 1,971,177 | French | Aug. 21, 1934 |
| 2,735,410 | Armburst et al. | Feb. 21, 1956 |